(12) United States Patent
Vermeulen

(10) Patent No.: US 11,046,512 B2
(45) Date of Patent: Jun. 29, 2021

(54) TRACK-SHELVING SYSTEM AND A KIT FOR CONVERTING A FRAME INTO A TRACK-SHELVING SYSTEM

(71) Applicant: CONTEYOR INTERNATIONAL NV, Merelbeke (BE)

(72) Inventor: Bart Vermeulen, Sint-Denijs-Westrem (BE)

(73) Assignee: CONTEYOR INTERNATIONAL NV, Merelbeke (BE)

( * ) Notice: Subject to any disclaimer, the term of this patent is extended or adjusted under 35 U.S.C. 154(b) by 0 days.

(21) Appl. No.: 16/331,759

(22) PCT Filed: Sep. 6, 2017

(86) PCT No.: PCT/EP2017/072378
§ 371 (c)(1),
(2) Date: Mar. 8, 2019

(87) PCT Pub. No.: WO2018/046554
PCT Pub. Date: Mar. 15, 2018

(65) Prior Publication Data
US 2019/0202634 A1 Jul. 4, 2019

(30) Foreign Application Priority Data
Sep. 9, 2016 (BE) .................. 2016/5686

(51) Int. Cl.
*B65G 1/02* (2006.01)
*B65G 1/04* (2006.01)
(52) U.S. Cl.
CPC ........... *B65G 1/026* (2013.01); *B65G 1/0457* (2013.01); *B65G 2207/30* (2013.01)
(58) Field of Classification Search
CPC ... B65G 1/026; B65G 1/0457; B65G 2207/30
See application file for complete search history.

(56) References Cited

U.S. PATENT DOCUMENTS 4,367,818 A * 1/1983 Suttles .................. A47F 7/28
211/162
4,401,221 A * 8/1983 Suttles .................. A47F 7/285
211/59.2

(Continued)

FOREIGN PATENT DOCUMENTS

FR 2723689 A1 * 2/1996 ........... B65G 1/0457
WO WO-2019125137 A1 * 6/2019 ............. B65G 9/002

OTHER PUBLICATIONS

International Search Report and Written Opinion of the International Searching Authority issued in PCT/EP2017/072378; dated Jan. 25, 2018; ISA/EP.

*Primary Examiner* — Stanton L Krycinski
(74) *Attorney, Agent, or Firm* — Harness, Dickey & Pierce, P.L.C.

(57) ABSTRACT

The present invention relates to a track-shelving system, comprising a frame (13) having a plurality of vertical posts (22) and a plurality of horizontal beams (21) supported by said vertical posts (22), and a track (35) and shelving (14) module connected to said frame, said modules comprise: •—a plurality of beam hooks (3), engaged with horizontal frame beams (21); •—a plurality of crossbeams (2), engaged with at least two beam hooks (3) via an opening in said beam hook; •—a plurality of rail hooks (5, 6), engaged to said crossbeams (2); •—a plurality of rail beams (4), supported by rail hooks (5, 6); •—a shelving assembly (28), movable between a paired set of rail beams (4), In a second aspect, the current invention relates to a kit for converting a frame into a track-shelving system.

45 Claims, 12 Drawing Sheets

(56) References Cited

U.S. PATENT DOCUMENTS

| | | | | |
|---|---|---|---|---|
| 4,717,305 | A * | 1/1988 | Edwards | B65G 1/0457 |
| | | | | 198/375 |
| 5,586,665 | A * | 12/1996 | Brousseau | A47F 7/285 |
| | | | | 193/12 |
| 5,628,415 | A * | 5/1997 | Mulholland | A47B 47/027 |
| | | | | 211/186 |
| 5,718,341 | A * | 2/1998 | Robertson | A47F 1/12 |
| | | | | 211/59.2 |
| 5,722,557 | A * | 3/1998 | Smith | B60R 11/00 |
| | | | | 206/583 |
| 6,059,125 | A | 5/2000 | Parham | |
| 6,105,798 | A * | 8/2000 | Gruber | B65G 1/023 |
| | | | | 211/151 |
| 6,145,678 | A * | 11/2000 | Morrison | A47B 53/00 |
| | | | | 211/113 |
| 6,360,901 | B1 | 3/2002 | Parham | |
| 7,475,955 | B2 * | 1/2009 | Dressendorfer | A47B 88/42 |
| | | | | 312/198 |
| 7,950,533 | B2 * | 5/2011 | Adams | A47F 5/01 |
| | | | | 211/60.1 |
| 8,459,475 | B2 * | 6/2013 | Higueroa | A47B 96/00 |
| | | | | 211/162 |
| 8,827,090 | B2 | 9/2014 | Kropveld | |
| 9,999,301 | B2 * | 6/2018 | Stauffer | A47B 47/0083 |
| 10,340,167 | B2 * | 7/2019 | Yoo | H01L 21/67769 |
| 2007/0246434 | A1 * | 10/2007 | Adams | A47F 5/01 |
| | | | | 211/8 |
| 2013/0020272 | A1 | 1/2013 | Kropveld | |
| 2013/0098856 | A1 | 4/2013 | Troyner et al. | |
| 2016/0143176 | A1 * | 5/2016 | Bernard | H05K 7/1497 |
| | | | | 312/201 |

* cited by examiner

TRACK-SHELVING SYSTEM AND A KIT FOR CONVERTING A FRAME INTO A TRACK-SHELVING SYSTEM

CROSS REFERENCE TO RELATED APPLICATIONS

This application is a U.S. National Phase Application under 35 U.S.C. 371 of International Application No. PCT/EP2017/072378 filed on Sep. 6, 2017, which claims the benefit of priority from Belgian Patent Application No. 2016/5686 filed on Sep. 9, 2016. The entire disclosures of all of the above applications are incorporated herein by reference.

TECHNICAL FIELD

The invention pertains to the technical field of storage in warehouses and/or magazines.

BACKGROUND

In times where globalization and time are essential and crucial aspects for commercial institutions, all kind of different products and materials have to be disposable in plurality to guarantee a swift and reliable service. To supply clients, customers and/or employees rapidly with the desired product, it is necessary to organize said products in a structural and convenient way without occupying too much space to cut costs. In addition, an important part of warehousing goods is picking of products for sale, which is generally done manually. This results in a time and labor consuming process of order picking which can represent op to 55% of operational warehouse costs. As a result, it is very important to efficiently store and organize products in a user-friendly, easy-to-access and clear storage system.

A broad variety of storage systems is known in the art. US 2,013,098 856 A1, for instance, describes a dual shelving unit for supporting both shelves and other items. To this end, removable and adjustable hook accessories are provided. U.S. Pat. No. 6,059,125 B1 and U.S. Pat. No. 6,360,901 B1, on the other hand, disclose bottle neck-hanging display devices. Furthermore, prior art document U.S. Pat. No. 8,827,090 B2 describes a track shelving system comprising a frame having vertical beams connected by and supporting horizontal beams, a support assembly comprising a plurality of beam hooks supported by the horizontal beams and a plurality of tracks, with each of the plurality of tracks being engaged with at least two of the beam hooks; a shelving assembly comprising vertical walls, a top wall, and a plurality of horizontal shelves whereby the top wall is connected to the top edges of said vertical walls. The shelving assembly includes a pair of rods connected to the wall by straps, whereby the rods are configured to be moved along the tracks to allow the shelving assembly to be moved to a desired horizontal position. However, the storage system described in U.S. Pat. No. 8,827,090 B2 requires the need for custom made beams and hooks to be applied on said pre-existing storage system which results in a relatively large cost.

In addition, the installing process of current storage systems is time consuming and requires a lot of specific skills and specialized tools, thereby inducing the need for an experienced installer—even for minor adaptations—and increasing the cost.

Another problem known in the current state of the art is related to the transportation aspect of current storage systems. Current storage systems provide solidity, and thus safety, by means of thick and firm material. This, however, implies a heavy weight and large proportions of the storage structure components which are not conveniently transported nor handled.

Therefore, there remains a need in the art for an improved and more universally applicable storage system which enables flexible adjusting to avoid costs due to customization; simplified installing to reduce the need and cost for tools and skills for the installation of a storage system; eased transport by reducing the weights and proportions of the components of the storage system without substituting solidity and safety therefore.

The present invention aims to resolve at least some of the problems mentioned above.

SUMMARY OF THE INVENTION

For this purpose, the present invention provides, in a first aspect, a track-shelving system according to claim 1. Said system composes a firm, safe and efficient storage system which can be easily customized or translocated.

In a second aspect, as described by claim 24, the current invention provides for an easily-transportable and light-weighted kit for converting an existing frame in a warehouse into a track-shelving system without the need for specific tools and/or skills, and allows for very easy customization.

by attachment to the rail assurance hole (51). A rail beam (4) is held in place by means of this feature.

Figure 12A:
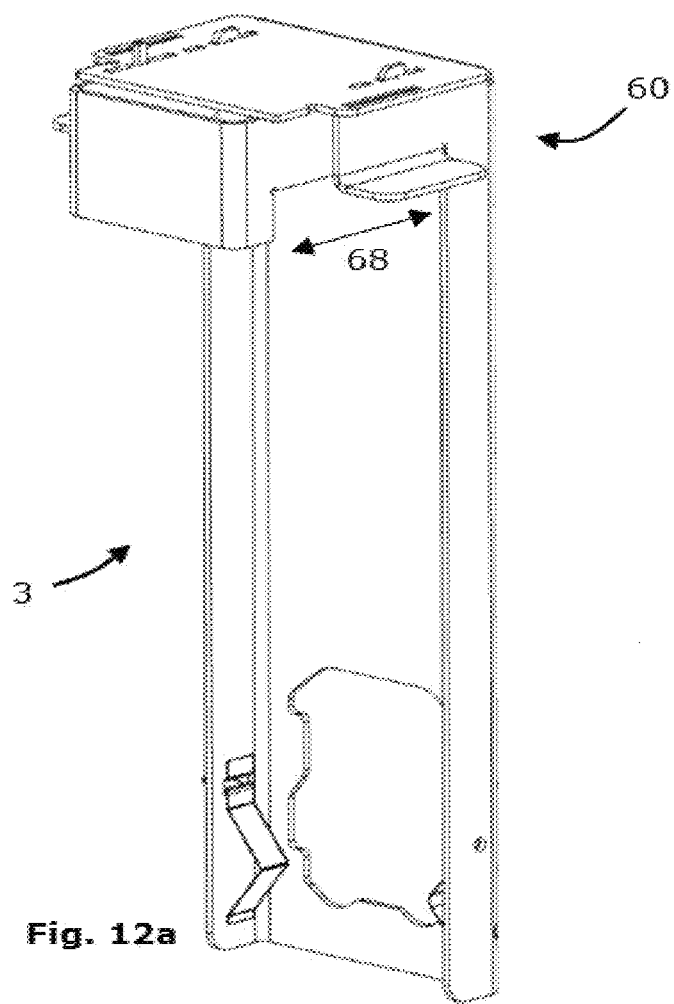
Figure 12B:
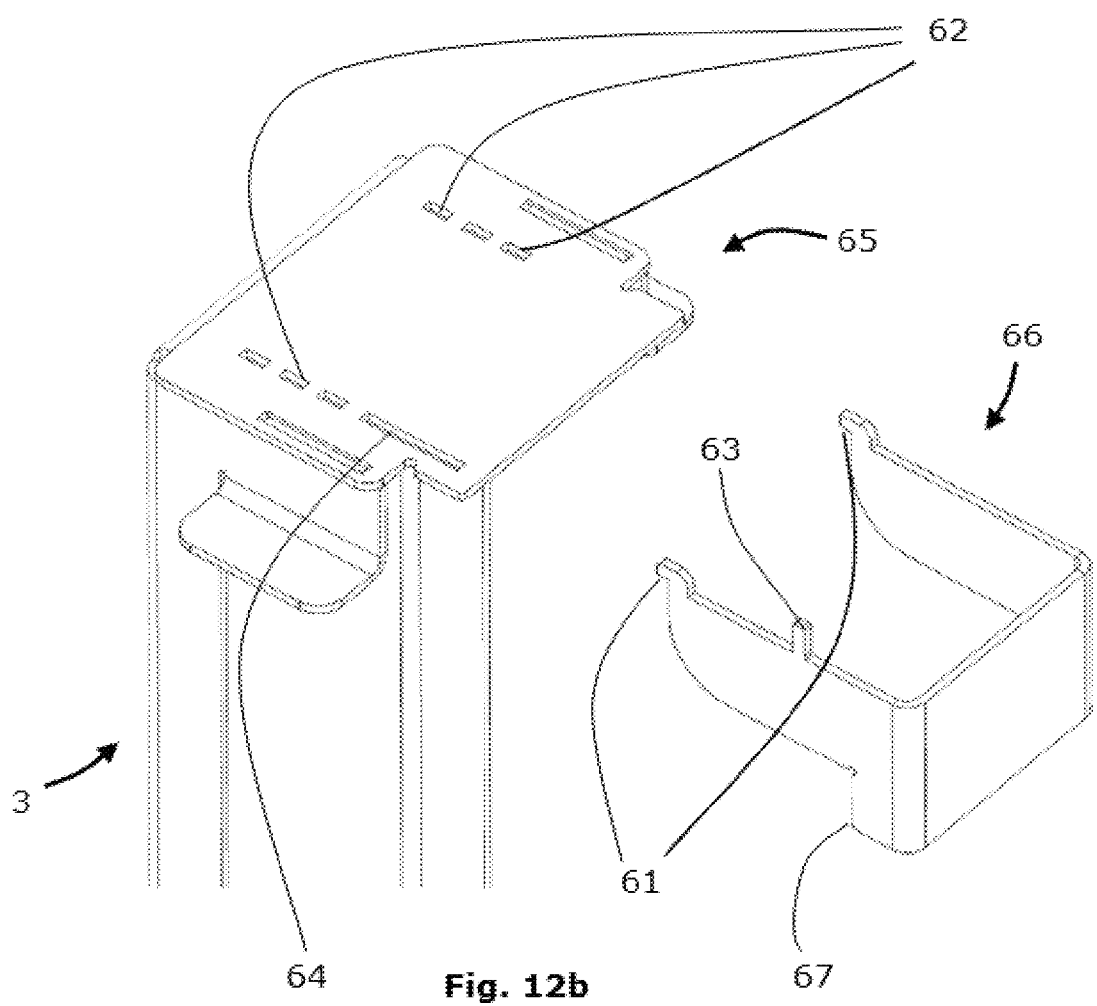
Figure 12C:
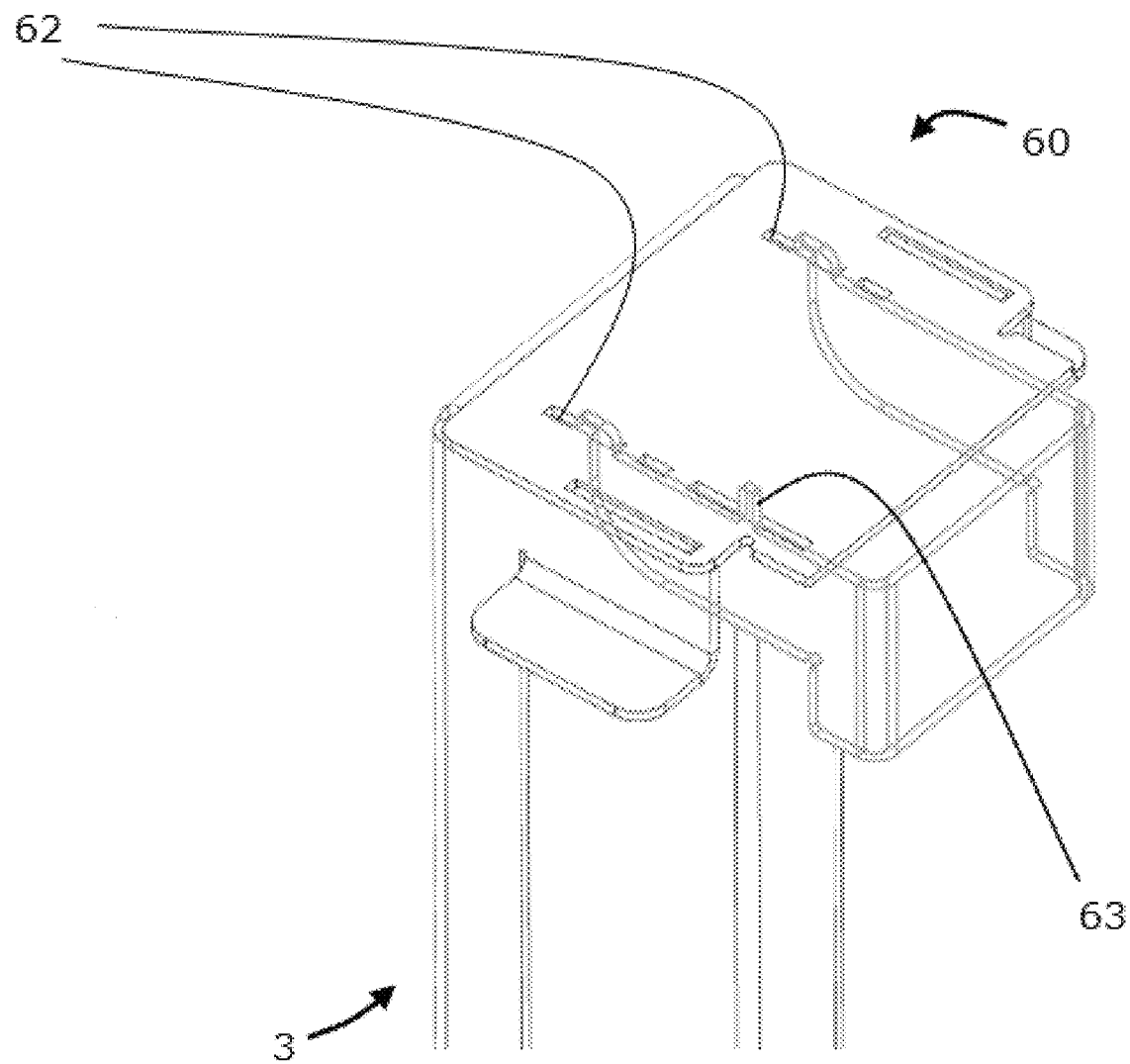

FIGS. 12 *a* to *c* shows a beam hook (3) comprising a width-adjustable hooking mechanism (60), according to the present invention.

Figure 13:
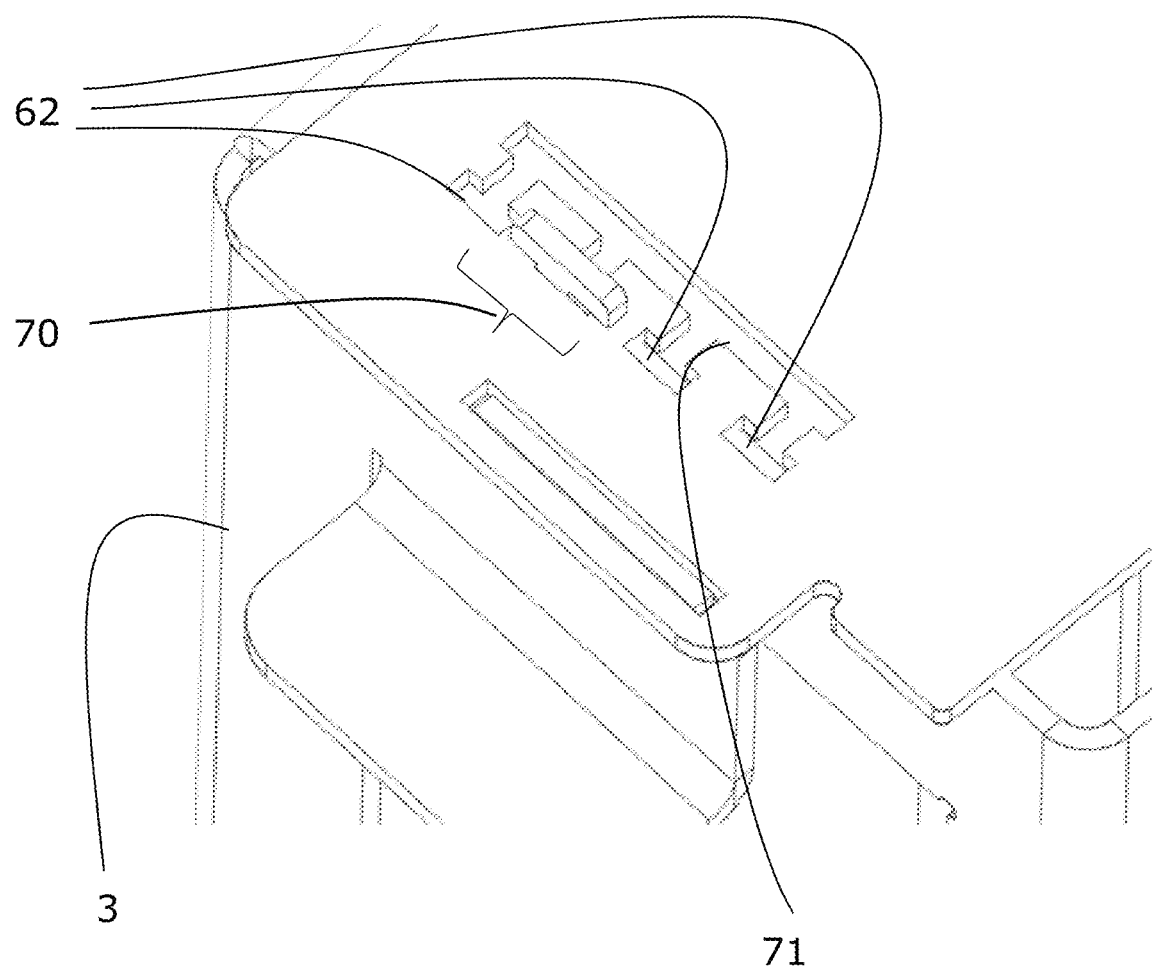

FIG. 13 shows a detail of an embodiment of a beam hook according to the current invention.

DETAILED DESCRIPTION OF THE INVENTION

The present invention concerns a track-shelving system; and a kit for converting a pre-existing structure into a track-shelving system.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

For purposes of description herein, the terms "upper", "lower", "right", "left", "rear", "front", "vertical", "horizontal", and derivatives thereof shall relate to the conventional meaning of these terms, unless otherwise stated. However, it is understood that the invention may assume various alternative orientations, except where expressly specified to the contrary.

The recitation of numerical ranges by endpoints includes all numbers and fractions subsumed within that range, as well as the recited endpoints.

In a first aspect the current invention relates to a track-shelving system which allows usage of an existing frame in a warehouse as a storage system. More specifically, the current invention relates to a track-shelving system comprising a) a frame having a plurality of vertical posts and a plurality of horizontal beams supported by the vertical posts, and b) a track and shelving module connected to said frame, said modules comprise:

a plurality of beam hooks, engaged with the horizontal frame beams;
a plurality of crossbeams, engaged with at least two beam hooks via an opening in said beam hook;
a plurality of rail hooks, engaged to said crossbeams;
a plurality of rail beams, supported by said rail hooks; and
a shelving assembly, movable between a paired set of rail beams;

whereby said crossbeams are provided with a plurality of indentations, regularly positioned along the length of said crossbeam for allowing clamping of said beam hooks and rail hooks to crossbeams.

This setup has the advantage of being easily modified to the customer's needs as the indentations present on the crossbeam enable attachment of structure components on desired distances from each other across the length of the crossbeam, while providing a firm, safe and efficient storage system.

In a further or alternative embodiment, said beam hooks and said rail hooks engage with such indentations, causing them to be clamped into said indentations. An advantage is that the position of both the rail hooks and the beam hooks can be installed along the length of the crossbeams, in a firm, efficient and detachable way. Moreover, it allows for adapting the track and/or shelving modules to a frame at hand.

Preferably, the beam hooks and the rail hooks are clamped into said indentations, at least along the longitudinal direction of the crossbeam. In other words, a hook that engages with said indentations should be disengaged again for it to be displaceable along the length of the crossbeam.

In a preferred embodiment, the engagement of beam hooks and/or rail hooks to a crossbeam is detachable. In a more preferred embodiment, the engagement of said hooks to a crossbeam comprises a detachable click-and-clamping mechanism. These features enable manual customization, as the rail hooks and/or beam hooks can easily be disengaged and replaced without the need for a specific set of tools and/or skills.

Preferably, said hooks comprise an opening through which a crossbeam can extend. More preferably, said beam hooks and rail hooks comprise an edge which encloses the opening of said hooks, and which enables detachable clamping of said hooks into the indentations of a crossbeam. In a more preferred embodiment, the edge enclosing the opening of a beam hook or rail hook defines one or more teeth which enable detachable clicking of said hooks into indentations present on the crossbeam. These means allow for a tool-free and easy disengagement and/or replacement of the track-shelving system, and thus enables easy and straightforward customization.

In a preferred embodiment, the opening of one or more rail hooks is incompletely enclosed by an edge. The latter allows disengagement and/or replacement of said one or more rail hooks without the need to disengage other beam hooks and/or rail hooks from a crossbeam.

In a preferred embodiment, said crossbeams comprise indentations every 5 to 100 mm, more preferably every 5 to 50 mm, and most preferably every 5 to 20 mm. The latter allows for customizing placement of said hooks at small intervals across the length of a crossbeam, and thus, enables a high degree of customization.

In yet another preferred embodiment, the beam hooks and/or rail hooks are provided with an assurance clip. The latter allows securing clamping of said hooks, and prevents undesired loosening or disengagement of said hooks from the crossbeam.

Preferably, the crossbeams, beam hooks, rail beams and rail hooks comprise a preferred profile-thickness of 1.5 to 2.5 mm, such as for instance 2 mm, which allows for a light weight, easy transport and effortless handling of said components, as compared to the current state of the art.

In a preferred embodiment, the crossbeams are comprised of two back-to-back rail beams. This allows for a nearly uniform production process of both rail beams and cross beams which reduces production costs, time and the like.

In another preferred embodiment, the beam hooks are attached to the horizontal frame beams by a hooking mechanism. In an even more preferred embodiment, said hooking mechanism comprises a width-adjustable hooking mechanism. The latter allows for the use of one type of beam hooks for frames with different widths of horizontal frame beams.

Preferably, the beam hooks and rail hooks comprise one or more at least partly folded edges. Said one or more partly folded edges provide firmness to said hooks, and allow for a relatively thin profile-thickness without compromising on safety, strength and stiffness.

In a preferred embodiment, the rail hooks comprise at least one small surface perpendicular to the main surface of rail hooks. Said small surface perpendicular to the main surface of the rail hooks supports at least part of a rail beam. These means prevent bending and/or sagging of rail beams. More preferably, said small surface, comprises one or more at least partly upright surfaces, preferably parallel to the main surface of the rail hook. Said one or more at least partly upright surfaces prevent slipping and/or falling of the rail from said small surface. Even more preferably, one or more fastening holes present on a rail beam are aligned to one or more fastening holes present on a rail hook, and fastened by means of one or more Rivets, screws or the like. Most preferably, a rail assurance clip is attached to a rail hook via a rail assurance hole present on the main surface of a rail hook. These means allow for detachably clamping rail beams between the rail assurance clip and the one or more at least partly upright surfaces of the small surface perpendicular to the main surface of the rail hook. The latter ensures fixation of rail beams, and thus safety, to the track-shelving system according to the current invention.

Preferably, rail beams are paired two by two. More preferably, paired rail beams are oriented in converse senses relative to each other. The latter allows paired rail beams to be connected by one or more common roller bars.

In another preferred embodiment, the rail beams comprises a portion for receiving mobility components. More preferably, said mobility components are attached to said roller bars. The latter enables synchronous movement of said mobility components in paired rail beams.

In a second aspect, the current invention provides for a kit for converting a frame into a track-shelving system, said kit comprises:
- a plurality of beam hooks;
- a plurality of crossbeams;
- a plurality of rail hooks;
- a plurality of rail beams; and
- shelving module components;

whereby, said crossbeams are provided with a plurality of indentations, regularly positioned along the length of said crossbeam. The latter allows clamping of the beam hooks and rail hooks to crossbeams on a desirable position across the length of said crossbeams. Preferably, said clamping of beam hooks and rail hooks to crossbeams can take place by means of a detachable clicking mechanism. Said detachable clicking mechanism enables installation, disengagement and replacement of hooks without the need for specific tools and/or skills. In this regard, the above-mentioned advantages can be repeated.

In a further or alternative embodiment, the invention in a second aspect relates to a kit comprising beam hooks, crossbeams, rail hooks, and rail beams, which kit is configured for transforming an existing frame into a track-shelving system as described above. Preferably, said beam hooks, said crossbeams, said rail hooks, and said rail beams are as described above. In particular, they are preferably configured for co-acting as described above.

In a preferred embodiment, the beam hooks comprise a width-adjustable hooking mechanism. This width-adjustable hooking mechanism allows beam hooks to be suspended at horizontal beams with different widths, and thus, to different types of frames.

In another preferred embodiment, beam hooks and rail hooks comprise an opening which is enclosed by an edge. The latter enables the possibility to detachably clicking beam hooks and rail hooks into the indentations of crossbeams. More preferably, said edge of beam hooks and rail hooks defines one or more teeth to optimize clicking—and clamping—of beam hooks and rail hooks into the indentations of crossbeams.

In an embodiment of the kit according to the current invention, the opening of rail hooks may be incompletely enclosed by an edge. The latter allows for disengagement and replacement of rail hooks without the need to disengage other beam hooks and/or rail hooks.

In yet another preferred embodiment, beam hooks and rail hooks comprise one or more assurance clips. These assurance clips are suitable to prevent undesired loosening and/or disengagement of hooks which are clamped onto crossbeams.

In a preferred embodiment, crossbeams are comprised of two back-to-back rail beams. This allows for a nearly uniform manufacturing process for both rail beams and crossbeams which substantially reduces manufacturing costs, time and the like.

Preferably, crossbeams comprise indentations every 5 to 100 mm, more preferably every 5 to 50 mm, and most preferably every 5 to 20 mm. The latter allows for placement of a hook on a desired position across the length of a crossbeam.

In a preferred embodiment, crossbeams, beam hooks, rail beams and rail hooks comprise a preferred profile-thickness of 1.5 to 2.5 mm, such as 2 mm. This thickness allows for a lighter weight, and thus for a more easily handling and transport of said components, as compared to the current state of the art.

In another preferred embodiment, beam hooks and rail hooks comprise one or more at least partly folded edges. The latter induces firmness to said hooks.

Preferably, rail hooks comprise at least one small surface folded perpendicular to its main surface. After installation of the kit according to the present invention, said perpendicular small surface allows for supporting rails, and preventing bending and/or sagging of rails. More preferably, said small surface comprises one or more upright surfaces parallel to the main surface of the rail hook. This feature may prevent a rail from slipping and/or falling of said small surface perpendicular to the main surface of the rail hook.

In a preferred embodiment, rail beams are suitable to be fastened to rail hooks by means of one or more Rivets, one or more screws or the like, through alignment of one or more fastening holes present on a rail beam with one or more fastening holes present a rail hook. Most preferably, rail hooks are provided with one or more rail assurance clip holes, which are suitable to connect a rail assurance clip to the rail hook. The rail assurance clip is suitable to detachably clamp a rail beam, thereby fixating the rail beam onto the rail hook to prevent falling or slipping of the rail beam.

In a preferred embodiment, the rail beams enclose a portion suitable for receiving mobility components. These mobility components enable easy replacement of shelving assemblies across the track system.

In another preferred embodiment, the shelving module components comprise at least a plurality of roller-bars, a plurality of mobility components, a pair of sidewalls, a top wall, one or more floors, one or more backstops and one or more top connection members.

In yet another preferred embodiment, the kit according to the current invention comprises a shelving module which is at least partly assembled. Said preassembly allows for a reduction of installing time and reduces the need for tools and/or skills.

Preferably, at least a portion of the top connection members, top wall, side wall, floor and/or backstop are flexible. This allows for a lighter weight, easy transport and effortless handling. More preferably, said at least partly flexible components are folded up in the kit according to the current invention to reduce proportions of the kit.

The invention is further described by the following non-limiting figures which further illustrate the invention, and are not intended to, nor should they be interpreted to, limit the scope of the invention.

GENERAL DESCRIPTION OF FIGURES

Figure 1:
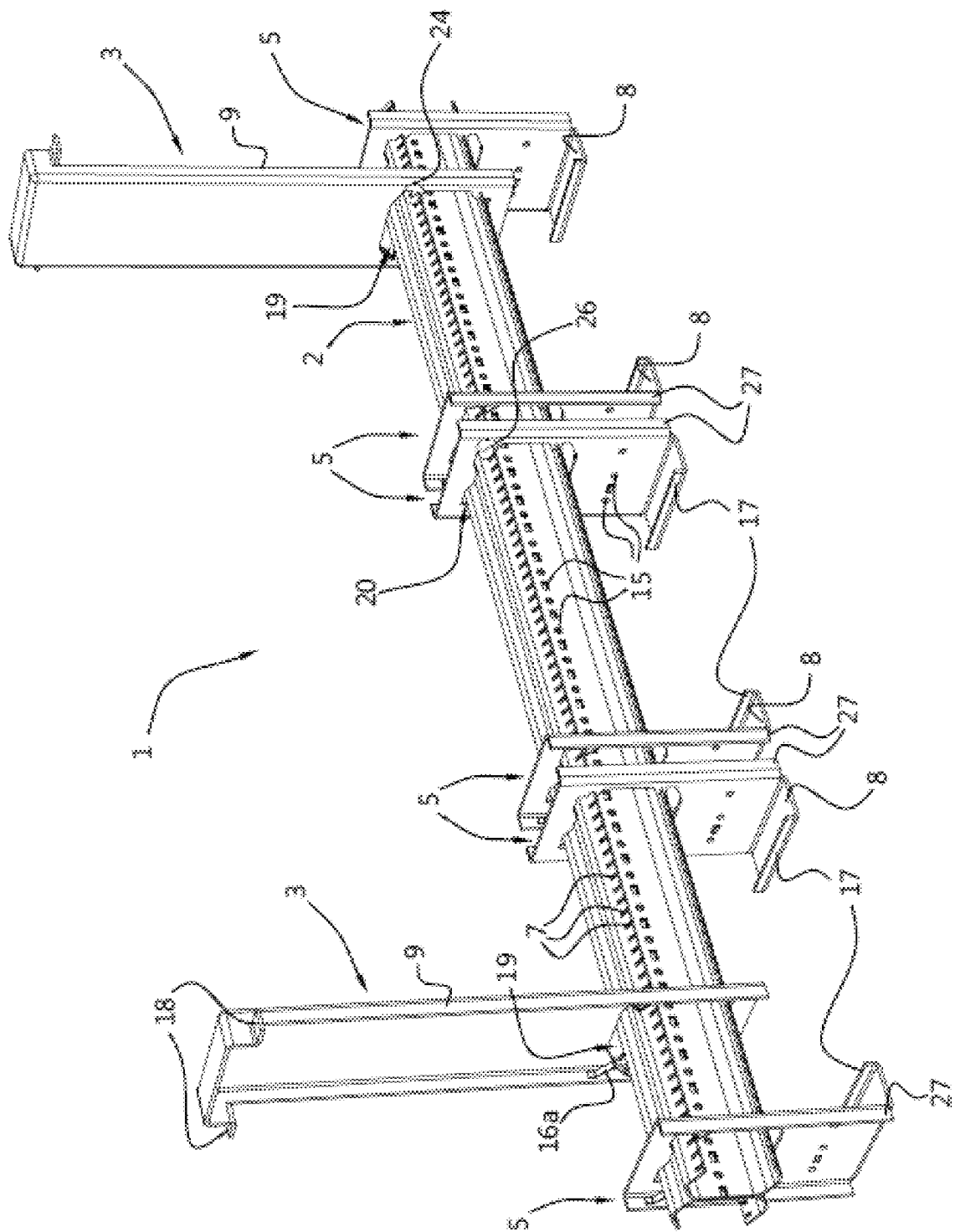
FIG. 1 shows a crossbeam (2) engaged with two beam hooks (3) and six rail hooks (5), thereby illustrating a preferred embodiment of an assembled crossbeam set (1), according to the present invention.

FIG. 1 shows an assembled crossbeam set (1) comprising a crossbeam (2), two beam hooks (3) and six rail hooks of the closed type (5). Both the beam hooks (3) and rail hooks (5) are detachably but firmly clamped to the crossbeam (2) by fitting teeth (24 and 26, for beam hooks and rail hooks, respectively) of said hooks into indentations (7) present on the crossbeam (2). For safety reasons, an assurance clip (16) detachably locks the clamping and prevents the hooks (3,5) from loosening spontaneously.

Figure 2:
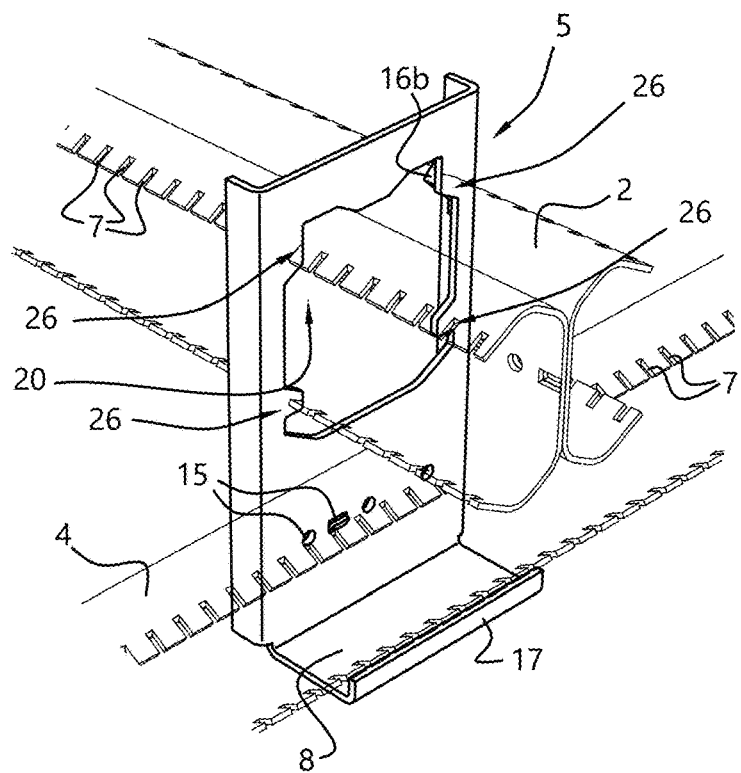
FIG. 2 shows a preferred embodiment of a rail hook of the closed type, the engagement of said rail hook (5) by means of teeth (26) onto a crossbeam (2), and the support of a rail beam (4) by a rail hook of the closed type (5), according to the present invention.

FIG. 2 shows a detail of a rail hook of the closed type (5). The opening (20) for receiving at least part of a crossbeam (2), is completely enclosed by an edge.

Figure 3:
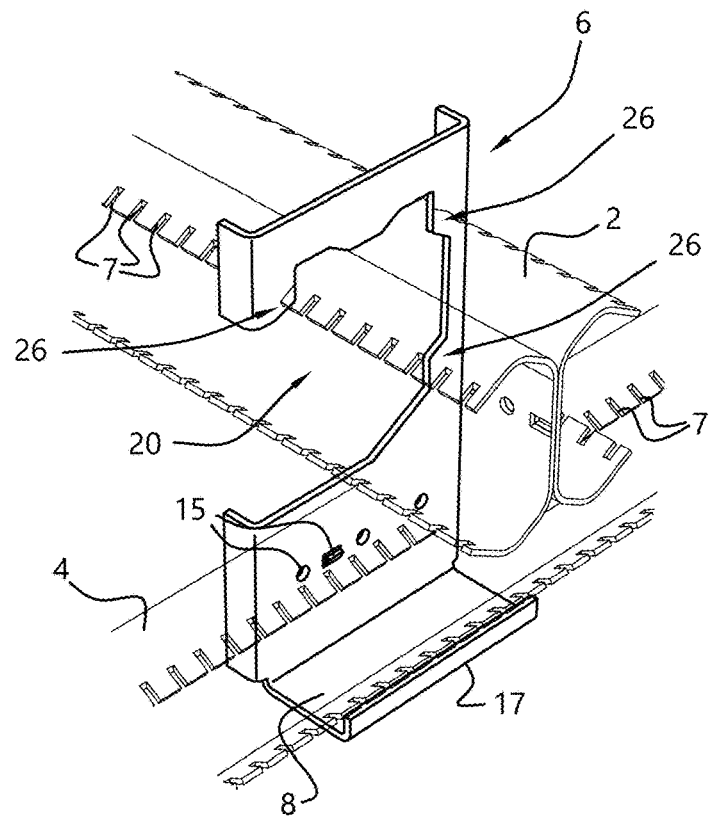
FIG. 3 shows a preferred embodiment of a rail hook of the open type, the engagement of said rail hook (6) by means of teeth (26) onto a crossbeam (2), and the support of a rail beam (4) by a rail hook of the open type (6), according to the present invention.

In contrast, FIG. 3 represents a rail hook of the open type (6) as the opening (20) for receiving at least part of a crossbeam (2) is not completely enclosed by an edge. Said hook of the closed type completely encloses the crossbeam (2) while being clamped to a crossbeam (2) by exact fitting of teeth (26) into indentations (7) present on the crossbeam (2), whereas a rail hook of the open type (6) does not completely enclose the crossbeam (2) while attached to the crossbeam (2) with teeth (26) to indentations the crossbeam (2) (FIG. 3). In both figures, part of a rail beam (4) is supported by a small surface (8) of said rail hooks (5,6). By providing a upright surface (17) at said small surfaces (8), the rail beam (4) is prevented from sliding or falling. The rail beams can optionally be secured by fastening (not shown) the rail beam (4) to the rail hook (5,6) by means of applying and attaching one or more Rivets, one or more screws or the like through the fastening holes (15).

Figure 4:
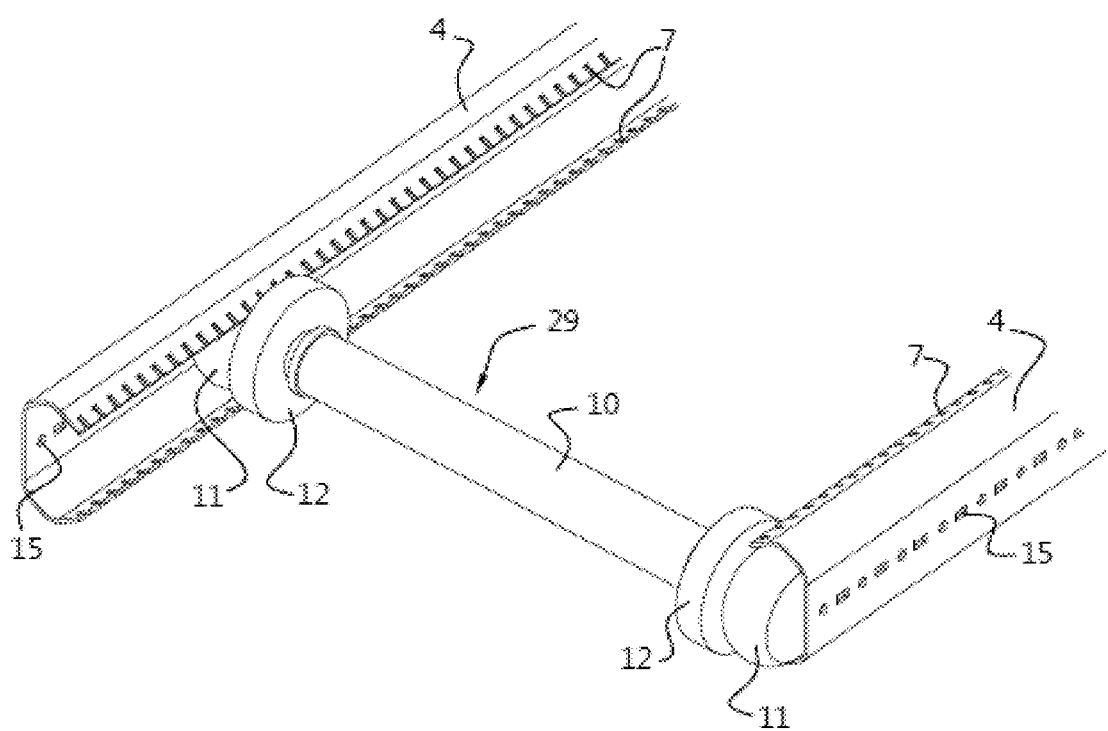
FIG. 4 shows a detailed representation of a preferred embodiment of a roller-bar (29), supported by two conversely oriented rail beams (4) providing a track for rolling or sliding of mobility components (11) connected to the extremities of a roller-bar (29), according to the present invention.

FIG. 4 shows a detailed representation of a roller-bar (29) for the suspension and displacement of a shelving assembly (28). Said roller-bar (29) comprises a rod-like structure (10) to which two wheels (11) and two discs (12) are attached. Said wheels are configured such that they are able to roll in rail beams (4) located opposite to each other, thereby enabling displacement of the roller-bar (29), and therefore, the shelving assembly, as is clarified in FIG. 8 (see below). The discs (12) prevent the wheels (11) from getting scratches and accelerated wear by prohibiting movement of the wheels (11) in a direction that is perpendicular—in a horizontal plane—to their rolling direction.

Figure 5:
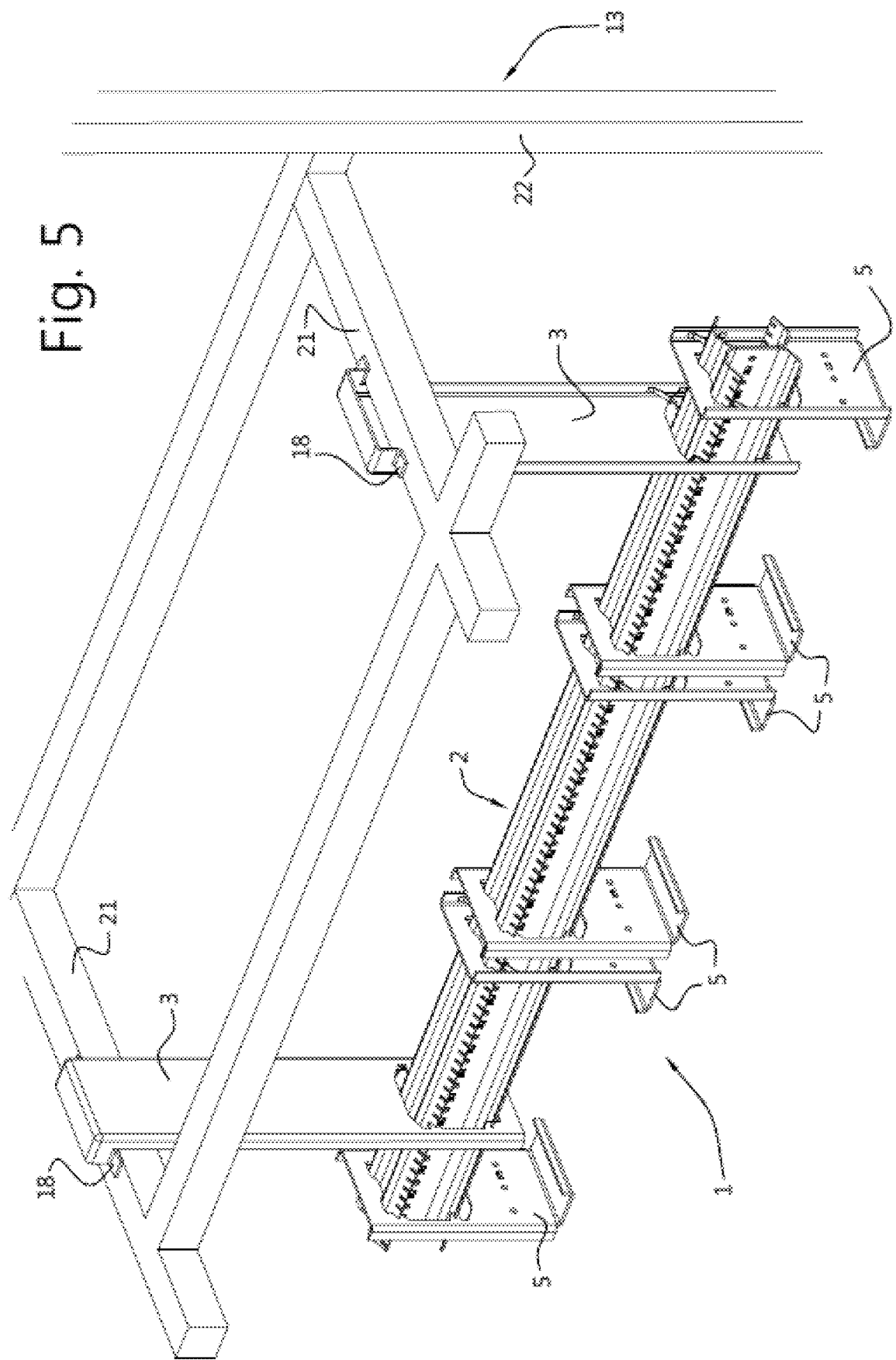
FIG. 5 shows a preferred embodiment concerning the suspension of a crossbeam set (1) onto a frame (13), according to the present invention.

FIG. 5 provides an illustration of the suspension of a crossbeam set (1) on a frame (13), for example a warehouse rack. Said crossbeam set (1) comprises a crossbeam (2), six rail hooks of the closed type (5) and two beam hooks (3). The beam hooks (3) and rail hooks (5) are clamped onto the crossbeam (2) by means of teeth (24 and 26 for beam hooks and rail hooks, respectively) that fit and detachably click into indentations (7) present on both sides of the crossbeam (2). Said beam hooks (3) are hung over a horizontal beam (21) of said frame (13), thereby supporting the crossbeam (2) and attached components.

Figure 6:
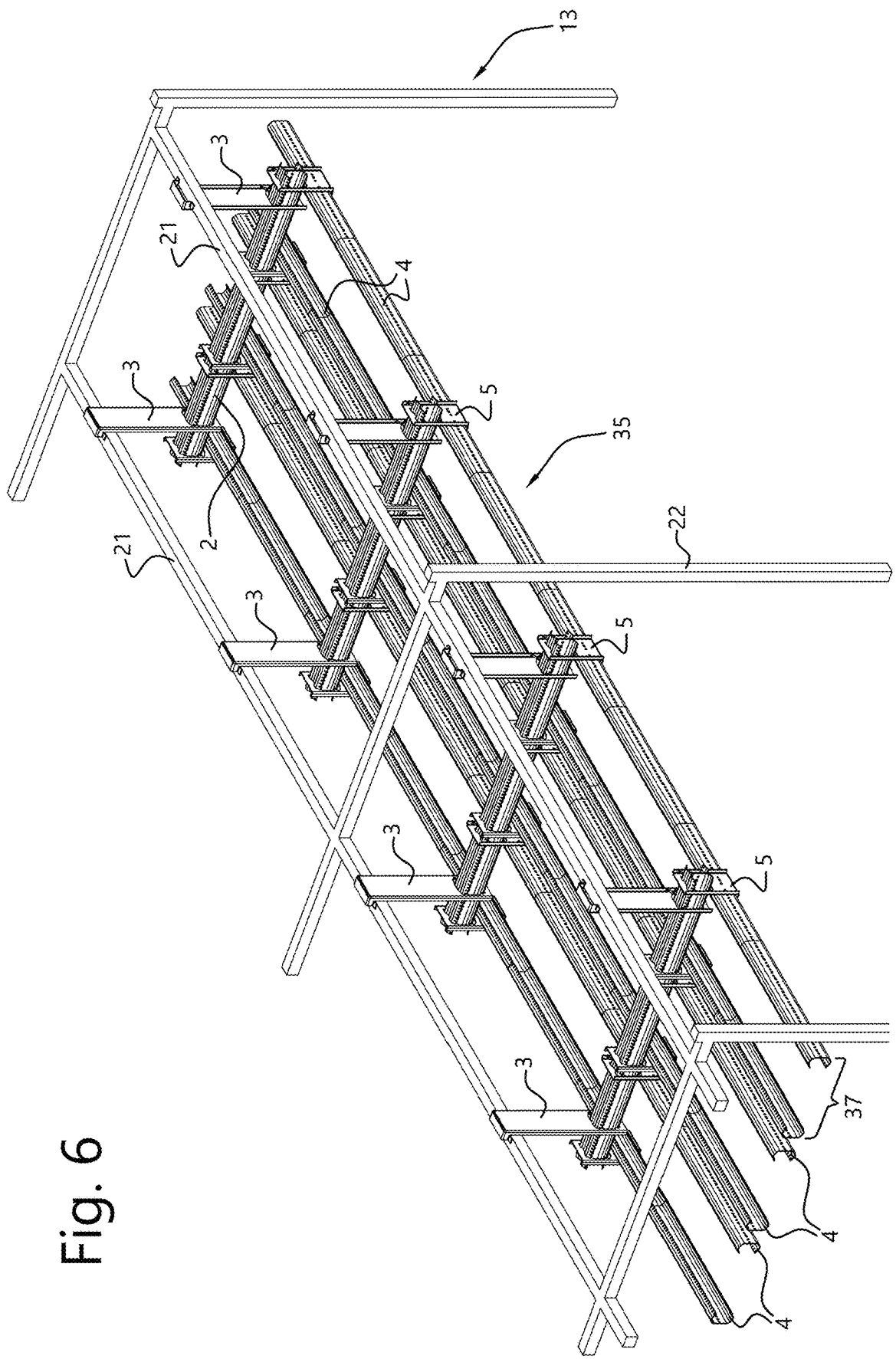
FIG. 6 shows a preferred embodiment of an assembled and suspended track module (35) onto a frame (13), according to the present invention.

FIG. 6 shows a track system suspended on a supporting structure (22). The track system comprises four crossbeams (2), eight beam hooks (3), six rail beams (4) and twenty-four rail hooks (5). Each crossbeam (2) is suspended by means of two attached beam hooks (3) to horizontal beams (13) of said supporting structure (22). Each crossbeam (2) carries six attached rail hooks (5) which in turn each support part of a rail beam (4). In FIG. 6, each rail beam (4) is supported by four rail hooks (5) which each are attached to different crossbeams (2).

Figure 7:
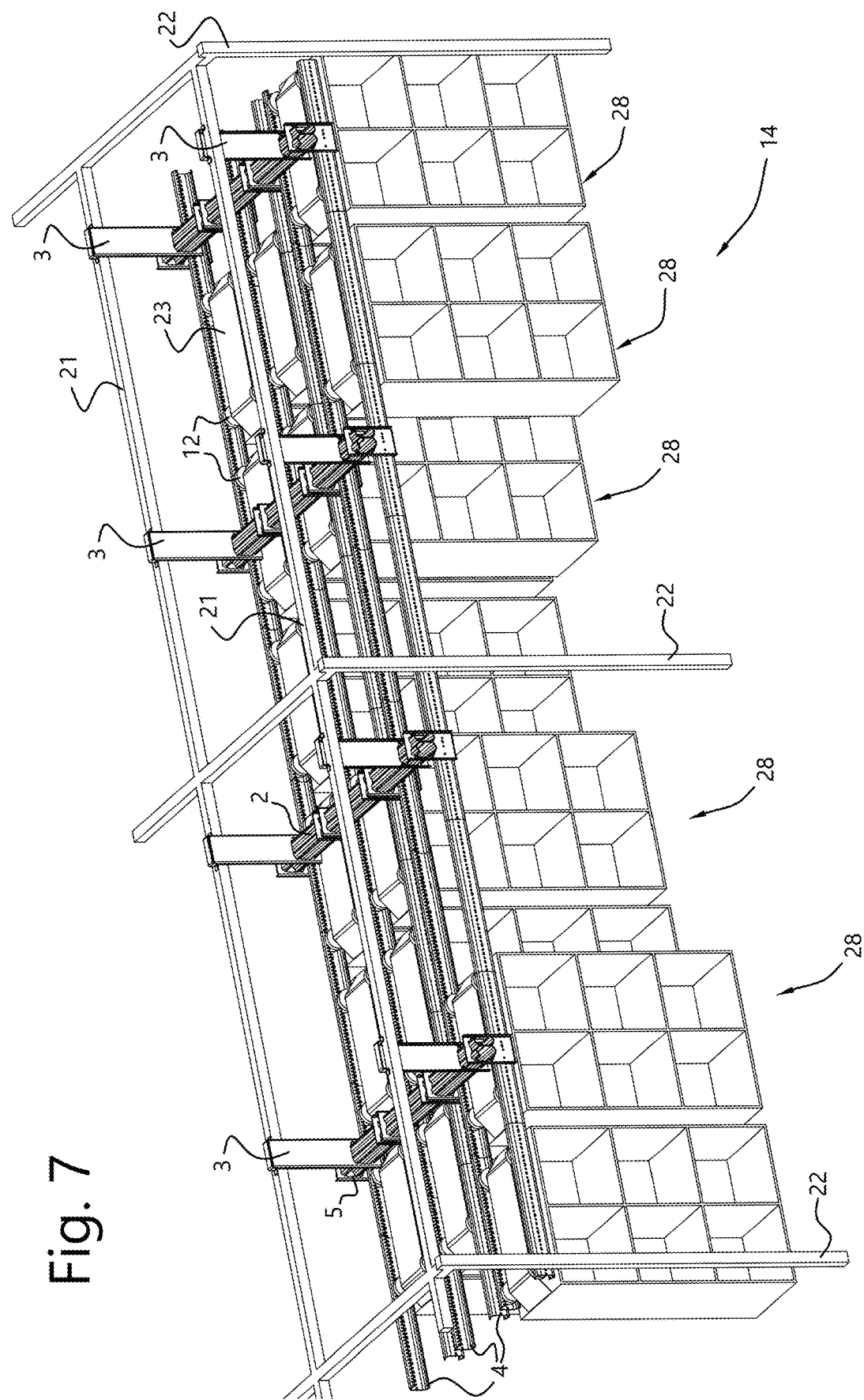
FIG. 7 shows a preferred embodiment of a track-shelving system, comprising a track module (35) and a shelving module (14), according to the present invention.

FIG. 7 shows a track shelving structure comprising a track module (FIG. 6) and a plurality of shelving assemblies (28). Each of said shelving assemblies (28) comprises a plurality of compartments (34), at least one top connection member (38), and two roller-bars (29). In this example, the plurality of compartments (34) is defined by three sidewalls (36), three floor walls (39), one top wall (31) and one backstop (40). At the top wall (31), a top component (23) attaches and suspends the shelving assembly (28) to two roller-bars (29, FIG. 4). The wheels (11) of said roller-bars (FIG. 4) are configured to roll in the slots of rail beams (4) of the track system (FIG. 6), thereby enabling easy displacement and movement of said shelving assemblies (28).

Figure 8:
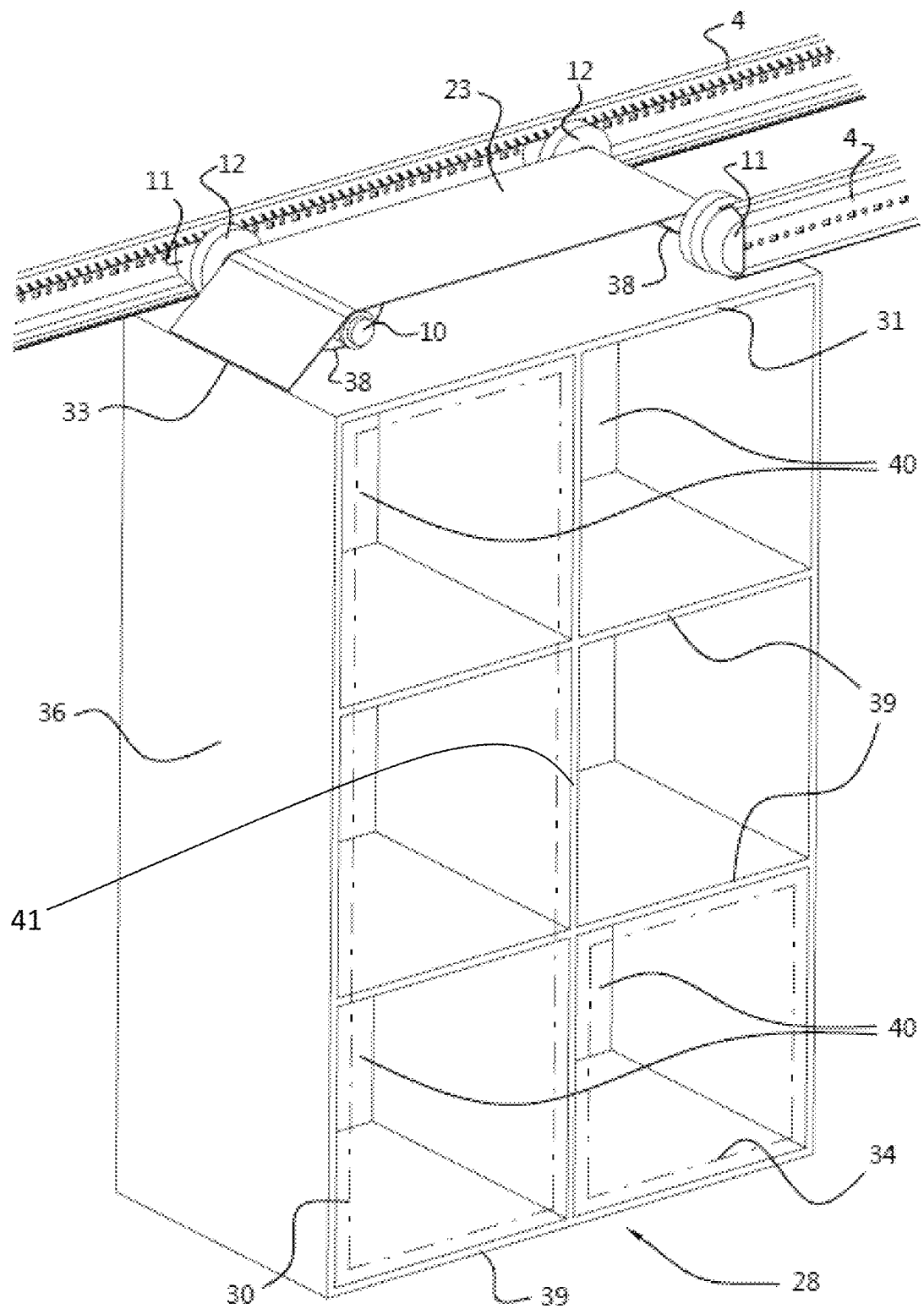
FIG. 8 shows a detailed and sectioned view of a preferred embodiment of the suspension of a shelving assembly (28) onto rail beams (4) of a track module (35), according to the present invention.

FIG. 8 shows a more detailed and partially sectioned view from a part of a shelving assembly (28) comprising top connection members (38), two roller-bars (29) and part of a shelving assembly (28). The flexible top connection member (38) is positioned over the two roller-bars (29), and its two ends are attached to the top wall (31) of the shelving assembly (28). The wheels (11) of said roller-bars (29) are configured such that they are able to roll in the slots of rail beams (4). Each roller-bar (29) furthermore comprises two discs (12) that are placed next to said wheels (11), yet said discs (12) are positioned just outside said slots of the rail beams (4) of the track system (FIG. 6) to hold the top component (23) in place, and to prevent the wheels (11) from getting scratches and accelerated wearing by prohibiting movement of the wheels (11) in an undesired direction.

Figure 9:
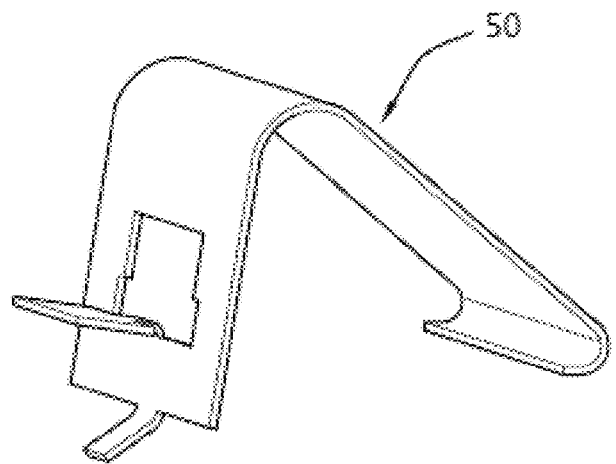
FIG. 9 shows a rail-assurance clip (50), according to the present invention.
Figure 10:
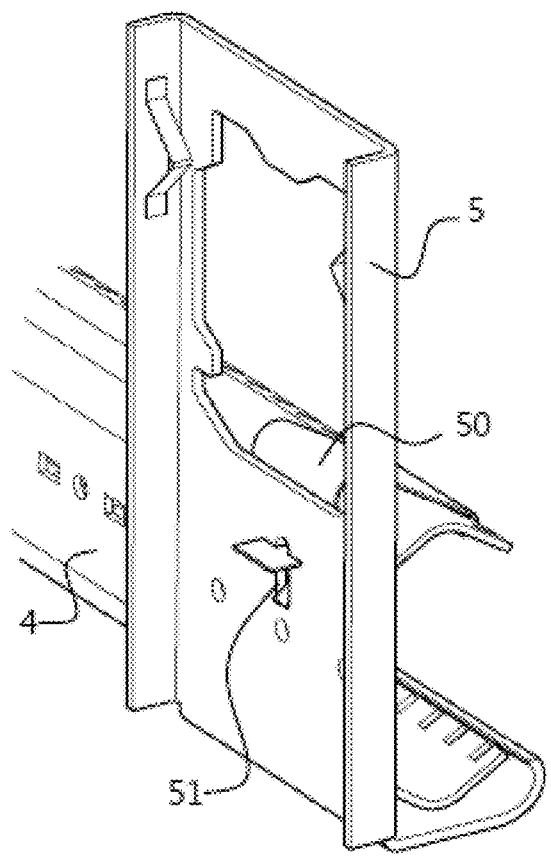
FIG. 10 and FIG. 11 shows the detachable connection of a rail assurance clip (50) to a rail hook of the closed type (5)
Figure 11:
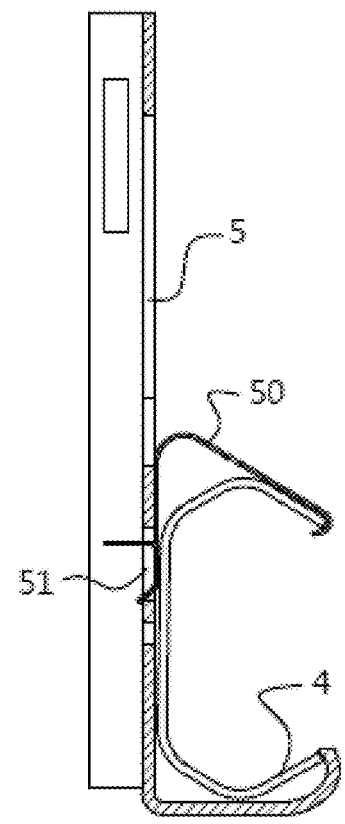

FIG. 9 shows a rail assurance clip (50), which can be detachably connected to a rail hook (5) by means of a rail assurance hole (51) as presented in FIG. 10 and FIG. 11. The rail clip (50) attached to a rail hook (5) by means of the rail assurance hole (51) allows for a reversible clamping of a rail (4), thereby fixating the rail (4) in place to prevent slipping, sliding and/or bending of the rail (4).

FIG. 12 shows a detailed view of the width-adjustable hooking mechanism (60) of a beam hook (3). Said width-adjustable hooking mechanism (60) comprises of a locking member (65) and a gripping member (66). The locking member (65) corresponds to the top surface of a beam hook (3) and provides adjustment holes (62) and one or more fixating grooves (64). The gripping member (66) comprises a securing element (67), adjustment pins (61) and one or more fixating elements (63). Said adjustment pins (61) can detachably lock into adjustment holes (62) of the locking member, thereby connecting the gripping member (66) to the locking member (65) of the width-adjustable hooking mechanism (60) of a beam hook (3). Upon placing the adjustment pins (61) into adjustment holes (62), the one or more fixating elements (63) align into the fixating groove (64). The part of the one or more fixating elements (62) extending above the fixating groove (64) can be bent to prevent the gripping member (66) from detaching spontaneously from the locking member (65). The distance (68) between the securing element (67) and the main surface of the beam hook (3) is dependent on the adjustment holes (62) in which the adjustment pins (61) are locked. This allows suspending beam hooks (3) on horizontal beams (21) with different widths.

FIG. 13 shows another preferred embodiment of adjustment holes (62) and adjustment pins (61) for a width-adjustable hooking mechanism (60). The adjustment pins (61) are provided with a hooking mechanism (70) themselves. By this means, the adjustment pins (61) can hook over the surface providing the adjustment holes (62), to prevent the gripping member (66) from detaching spontaneously from the locking member (65). A sliding groove (71) uniform with the adjustment holes (62) is provided to apply and correctly position the adjustment pins (61) with regard to the adjustment holes (62).

DETAILED DESCRIPTION OF FIGURES

The invention provides for a track-shelving system comprising a track module (35) and a shelving module (14). The track module (35) supports the shelving module (14) above a floor and allows access to each individual compartments (34) within the storage module (14).

In the illustrated example, a frame (13) (FIGS. 5, 6 and 7) supports the track module (35). The frame (13) can comprise a pre-existing structure (13) located within a building (e.g. warehouse) or can be a structure specifically designed or placed to support the track-shelving system. The typical frame (13) includes a plurality of vertically orientated posts (22) extended upwardly from the ground. Said posts (22) form corners of connected rectangles when viewed from above. A pair of horizontal beams (21) extends between the tops of the posts (22) at a front and a rear of the frame (13), and optionally, a plurality of struts (not shown) extend between the posts (22) at the sides of the frames. Said struts can be angled between the posts (22) or can be horizontally positioned. It is contemplated that the posts (22), the beams (21) and the struts can have any cross-sectional shape (e.g. L-shaped, U-shaped or rectangular). Although not shown, it is contemplated that the frame (13) can comprise walls and/or the ceiling of an area (e.g. warehouse). The frame (13) supports the track-shelving system according to the present invention, above the ground.

The illustrated shelving module (14) comprises shelving assemblies (28) which contain compartments (34) for storage of products and/or goods therein. The shelving module (14) is supported by a track module (35) which is attached—by hooking—to the frame (13). The track module (35) includes at least one pair of beams—crossbeams (2)—connected to the frame (13). It is contemplated that said crossbeams (2) are connected in a firm yet easily removable fashion by means of a hook system.

In the illustrated example (FIGS. 5 and 6), said hook system comprises at least two hooks—beam hooks (3)—per crossbeam (2). For every crossbeam (2), at least one pair of beam hooks (3) is attached to and supported by the frame (13) and said hooks are associated with opposing—front and rear—horizontal beams (21) of the storage structure. Attachment of the hooks to the storage structure takes place by topping the beam hook (3) over a horizontal beam (21) of the frame (13). It is contemplated that the beam hooks (3) comprise an opening (19) through which the crossbeam (2) is received, thereby inducing engagement of the crossbeams (2) in a substantially parallel fashion to the struts, and perpendicular to the horizontal beams (21) of the pre-existing structure (13). The edge enclosing the opening (19) of the beam hooks (3) defines one or more teeth (24) which enable detachable clicking and clamping of beam hooks (3) onto the crossbeam (2) which comprises complementing indentations (7) at regular intervals across its length.

In a preferred embodiment, crossbeams (2) comprise an indentation (7) every 20 mm, more preferably every 15 mm, even more preferably every 10 mm across their length. In another embodiment, the indentations are comprised over a distance between 5 and 10 mm.

The detachable click-and-clamp mechanism for the attachment of beam hooks (3) to crossbeams (2) substantially diminishes the need for specialized tools, enables very short installing times compared to current track-shelving systems, and allows for effortless customization. Said customization is enabled by the presence of the indentations (7) at regular and short intervals across the length of the crossbeam (2).

The edge enclosing the opening of a beam hook (3) furthermore comprises at least one assurance clip (16a) to secure clamping of beam hooks (3) to crossbeams (2).

In the current state of the art, profiles of 3 or 4 mm thickness are used for the manufacturing of track module components. In contrast, the track module according to the present invention comprises crossbeams (2), beam hooks (3), rail beams (4) and rail hooks (5,6) which are constituted from profiles of approximately 2 mm thickness.

In the illustrated example (FIGS. 1, 5, 6 and 7), the side edges (9) of the beam hooks (3) are folded perpendicular to the opening (19) of the beam hook (3). These folded edges (9) allows for the use of relatively thin material—especially compared to the current state of the art—to fabricate lighter beam hooks (3) without immolating firmness, and thus, safety of the cross rail hooks (3).

Lighter weight of said hooks and beams allows for easier transport and a nearly effortless manageability during the installing process of a track-shelving system according to the present invention. This, in turn, results in reduced transportation costs and a reduction of installation time.

The track module, according to FIGS. 1, 5, 6 and 7, furthermore comprises six rail hooks (5)—oriented as pairs in converse senses—per crossbeam (2). Said hooks (5) include a main surface which is vertically oriented and is provided with an opening to receive a crossbeam (2). The main surface of said rail hooks (5) is oriented parallel to the main surface of the beam hooks (3). The rail hook furthermore comprises—perpendicularly orientated as compared to its main surface—a small surface (8) with an upright surface (17). The upright surface (17) is illustrated in FIGS. 1, 2, 3, 5, 6 and 7 to be parallel to the main surface of the rail hook (5). Analogously to the crossbeam (2), the rail hooks (5) comprise an opening (20) of which the shape of the edge defines teeth that can be detachably clicked into the complementary indentations (7) present at regular intervals across the length of the crossbeam (2), thereby inducing a detachable clamping mechanism of the rail hook (5) onto the crossbeam (2).

The main surface of the rail hooks (5) further comprises an assurance clip (16b) to prevent spontaneous loosening of the clamping of the rail hooks (5) to the crossbeams (2), and fastening holes (15) positioned under the opening (20) of the rail hooks (5).

In a preferred embodiment, assurance clips (16a,16b) open when placing rail hooks and/or beam hooks onto the cross beam, and only close when said hooks are positioned correctly relatively in view of the indentations (7) of the crossbeam (2). As illustrated in FIGS. 5, 6 and 7, the small surface (8) of the rail hooks (5) is perpendicularly orientated as compared to the main surface of the rail hook (5). Said small surface (8) of the rail hooks (5) supports at least part of a rail beam (4) of the track module (35). The upright surface (17) of the small surface (8) holds the rail beam (4) in its place, and prevents rail beams (4) from slipping, bending and/or falling off. In the illustrated example, both the main surface of the rail hook (5) and the rail beam (4) comprise fastening holes (15) which can optionally be connected and safened by means of one or more Rivets, one or more screws or the like (not shown). FIGS. 9, 11 and 12 illustrate a more preferred embodiment whereby the rail beams (4) are detachably fixed to the rail hooks (5,6) by means of a rail assurance clip (50) clamped to a rail assurance hole (51) present on the main surface of the rail hook (4).

Analogously to the side edges (9) of the beam hooks (3), the edges of the main surface of the rail hooks (5) are folded (27) perpendicularly to the main surface of the rail hooks (5) to allow for the use of thinner material, yet still provide firmness to the rail hook (5), and thus safety, the track-shelving system in general.

Two types of rail hooks (5,6) are disclosed in the present invention: rail hooks of the closed type (5 and FIG. 2), and rail hooks of the open type (6 and FIG. 3). A rail hook of the closed type (5) comprises an opening (20) which is completely enclosed by an edge, in its main plate, whereas the opening (20) of rail hooks of the open type (6) are not completely enclosed by an edge, and thus, constitutes a G-like shape (mirrored G-like shape in FIG. 3).

Both types of rail hooks (5 and 6) comprise at one or more teeth (26) that are complementary and clickable into the indentations (7) present across the length of crossbeams (2). These features of the present invention enable easy and detachable placement by a click-and-clamping mechanism. Additionally, the clamping mechanism and presence of indentations (7) across the whole length of the crossbeams (2) allow simple and straightforward customization. For example, a crossbeam (2) can be shortened without sacrificing hooks (3,5,6) or other components placed on the removed fraction of said crossbeam, since hooks (3,5,6) or other components can easily be detached and replaced at one or more of the indentations (7) on the conserved fraction of said crossbeam (2). Furthermore, the small intervals by which said indentations (7) are present, allow for easy and manual customization in the margin of the length of the interval by simply disengaging and replacing the beam hooks (3) to another indentation (7).

Rail hooks of the open type (6 and FIG. 3) have the advantage that they can be placed onto the crossbeams (2) after attaching crossbeams (2) to beam hooks (3). Rail hooks of the closed type (5 and FIG. 2) need to be placed over the crossbeam (2) before attaching the crossbeam (2) to beam hooks (3). Nevertheless, it is emphasized that the rail hooks of the closed type (5 and FIG. 2) are—when placed over the crossbeams—very easily replaceable across the length of the crossbeam (2).

The rail beams (4) supported by one or more rail hooks (5, 6) are conversely orientated to each other, as illustrated in FIG. 6, and perpendicularly with regard to the crossbeams (2).

In the current state of the art, the rail beams being part of a same pair are mirrored images of each other—left hand and right hand rail beams —, and thus, need to be manufactured as separate entities. Opposed hereto, the present invention comprises rail beams with at least one symmetrical axis, and thus, can be applied as both left hand and right hand rail beams. This simplifies and reduces the cost and time needed for both the manufacturing process and the installation process.

The rail beams (4) have a C-like cross-sectional shape in the illustrations; however, said rail beams (4) could have any cross-sectional shape comprising a J-like shaped bottom portion and a top portion to define a receiving area there between, as long as the rail beams (4) comprise at least one axis of symmetry.

In a most preferred embodiment, the crossbeams (2) discussed in the present invention are manufactured from back-to-back attachment of two rail beams (4). This allows for a uniform production process—exempt from the back-to-back addition of the rail beams for the production of crossbeams (2)—for both the rail beams (4) and crossbeams (2). This allows for faster and more efficient production processes.

Due to the converse orientation of paired rail beams (4) as mentioned above, the receiving area of a rail beam (4) faces towards the receiving area of its paired rail beam (4). As illustrated in FIGS. 2, 3 and 6; the bottom portions of the rail beams (4) rest on the small surface (8) of the rail hook (4). The upright surface (17) of the small surface (8) holds the rail beams (4) in their places and prevents them from falling, slipping and/or moving.

In the illustrated example (FIG. 6), each rail beam (4) is supported by four rail hooks (5) across its length. However, it is contemplated that any number of rail hooks (5,6) could hold each rail beam (4). Optionally, the rail beams (4) can be fastened to the rail hooks (5,6) by aligning and connecting (not shown) fastening holes (15) present in the rail beams (4) as well as in the main surface of the rail hooks (5,6).

One pair of conversely oriented and adjacent rail beams (4) constitutes a track (37) which supports a shelving assembly (28) using one or a pair of roller-bars (29) that are configured to roll or slide along the rail beams (4). While the roller-bars (29) are shown as including wheels (11) for rolling, it is contemplated that the roller-bars (29) could include slide blocks or other slide members for sliding along the rail beams (4). While three pairs of rail beams (4) are illustrated in the drawings, it is contemplated that any number of pairs of rail beams (4) could be used, depending on the desired length or width of the shelving modules (14) and/or the dimensions of the frame (13).

In a preferred embodiment, the beam hooks (3) comprise a width-adjustable hooking mechanism (60) which allows the hooking of a beam hook (3) to a horizontal beam (21), independent on the width of the horizontal beams (21) of said frame. A preferred embodiment of said width-adjustable hooking mechanism (60) is illustrated in FIG. 12, whereby said width-adjustable hooking mechanism (60) comprises a gripping member (66) which is detachably connected to a locking member (65) by locking adjustment pints (61) present on the gripping member (66) into a pair of adjustment holes (62) present on the locking member (65). When adjustment pins (61) are correctly positioned into adjustment holes (62), the fixating element (63) will be positioned into the fixating groove (64), and the top-extending part of the fixating element (63) can be bent to prevent the gripping member (66) from detaching spontaneously. Another manner to keep the gripping member (66) and the locking member (65) together is by applying an elastic strap around both components. The distance (68) between the securing element (67) and the main surface of the beam hook (3) defines the maximal width of a horizontal beam (21) over which a beam hook (3) can be suspended. Positioning of adjustment pins (61) into a different pair of adjustment holes (62) will result in a corresponding distance (68) between the main surface of the beam hook (3) and the securing element (67). The latter enables beam hooks (3) to be suspended to horizontal beams (21) with different widths. In a more preferred embodiment, showed in FIG. 13, the adjustment pins (61) are provided with a hooking mechanism (70) themselves. Said hooking mechanism (70) allows hooking of the adjustment pins (61) over the surface providing the adjustment holes (62). In this way, the gripping member is prevented from detaching spontaneously, without the need to bend or one or more elements or to use one or more tools or components. A sliding groove (71) uniform with, and positioned next to the adjustment holes (62) allows the adjustment pins (61) of the gripping member (66) to be positioned correctly with regard to the adjustment holes (62) of the locking member (65).

In the illustrated example, each shelving component (30) includes a plurality of compartments (34) which can be used for storage of products and or goods. Each shelving component (30) includes a pair of sidewalls (36), a plurality of floors (39), a plurality of backstops (40), and a pair of top connection members (38). Each floor (39) extends between the pair of side walls (36) and defines one of the compartments (34). One of the backstops (40) is located at the rear of each compartment (34) and also extends between the pair of side walls (36).

The side walls (36), the floors (39), and the backstops (40) can be made of a flexible material to allow the side walls (36) to be pushed together when the shelving assembly (28) does not include any products or goods therein. However, it is contemplated that the shelving assemblies (28) or any portions thereof could be formed of rigid materials. FIGS. 7 and 8 illustrate that a plurality of shelving assemblies (28) are supported on the track module (35). In the illustrated example, six shelving assemblies (14) are supported by one pair of rail beams (track, 37), along with three pairs of rail beams (4). It is emphasized that any number of shelving assemblies (28) and/or tracks (37) could be applied. Furthermore, each shelving assembly (28) includes six compartments (34) which are stacked as three by two compartments (34). It is contemplated that the illustrations merely represents an embodiment and that other embodiments may comprise any number of compartments (34), horizontally as well as vertically.

In use, the track-shelving system is filled with products and/or goods by placing the products and/or goods into the compartments (34). Each shelving assembly (28) can be moved along the rail beams (4) to allow a shelving assembly (28) located behind the front row of shelving assemblies (28) to be accessible. Products and/or goods can be selectively removed from the compartments (34) of the track-shelving system in substantially the same manner as filling the compartments (34), but with removing the products from the compartments (34) instead of placing the products within the compartments (34).

FIGS. 7 and 8 show a track-shelving system wherein all the compartments (34) face in one direction such that the products are accessible from an aisle in front of the frame (13) or by moving one or more shelving assemblies (28) aside to access compartments (34) positioned in shelving assemblies (28) behind the first row of shelving assemblies (28). Evidently, the orientation of the compartments (34) is not limited hereto as FIGS. 7 and 8 merely represent one embodiment of the present invention.

In another embodiment, compartments (34) of shelving assemblies (28) may be facing adjacent shelving assemblies (28) such that the products and/or goods are accessible by forming an aisle between shelving assemblies (28).

In yet another embodiment, compartments (34) of shelving assemblies (28) may be directed to the outside of the pre-existing structure (13) such that the products are accessible from an aisle in front, behind or aside the pre-existing structure (13).

To mobilize the shelving assemblies (28), the top connection members (38) of the shelving assemblies (28) are attached to one or more roller-bars (29) connected with each of their extremities to a mobility component (11), which enable sliding or rolling of each individual shelving assembly (28) along the rail beams (4).

It is contemplated that a row of shelving assemblies (28) could be connected together—by each adjacent pair of shelving assemblies (28) sharing a sidewall (36) as discussed above—such that a row of the shelving assemblies (28) move together.

In the illustrated example (FIG. 8), the roller-bars (29) are extended through a space defined by the top connection members (38). The extremities of the roller-bars (29) are connected to wheels (11) or other mobility components such as sliding blocks (see above). Said attached wheels or other mobility components debouch in the receiving portion of the rail beams (4). To prevent the wheels (11) or other mobility components from moving in a direction perpendicular to the length of the rail beams (4), the roller-bars (29) are provided with two discs (12). The roller-bar (29) extends through the center of the discs (12) which are placed such that the edges of the rail beams (4) delineating the receiving portions of the rail beams (4) are each sandwiched between one of the wheels (11)—or other mobility components—and one of the discs (12) provided by the roller-bar (29) (FIGS. 4 and 8).

It is illustrated in FIGS. 4 and 8 that said discs (12) comprise a circular shape. Evidently, the shape of the discs (12) is not limited hereto.

The presence of the discs (12) precludes movement of the top component (23), and more specific the top-connection members (38), towards the wheels (11)—or other mobility components. In this way, undesirable interference of top-connection members (38) with the mobility of the wheels (11) is prevented.

As discussed above, the present invention provides for a track-shelving system which is lighter, and thus, easier transportable. In addition, the present invention distinguishes itself from the prior art by providing components which can be assembled without specialized tools or an experienced set of installing skills, due to its simple and detachable click-and-clamp nature.

The present invention, therefore provides in a second aspect, a kit for converting a pre-existing structure into a track-shelving system.

Said kit comprises necessary components to convert a frame into a track-shelving system as discussed above. Said components include at least a plurality of beam hooks (3) which can be hooked over the horizontal beams (21) of a frame (13) and allow reception of, and detachable clamping to, crossbeams (2) as disclosed above; a plurality of crossbeams (2) which can be engaged with at least two beam hooks (3) via an opening (19) in said hooks (3); a plurality of rail hooks (5,6) which can be engaged—and detachably clamped as discussed above—to said crossbeams (2) via an opening in said rail hooks (5,6); a plurality of rail beams (4) which can be supported by said rail hooks (5,6) as discussed above; and components to assemble a shelving module (14) as disclosed above.

The components to assemble a shelving module (14) comprise at least a plurality of roller-bars (29) comprising discs (12) and means to connect mobility components at its extremities; a plurality of mobility components (11); a pair of sidewalls (36); a top wall (31); one or more floors (39); and one or more backstops (40).

In a preferred embodiment, the kit comprises a plurality of beam hooks (3) which can be hooked over the horizontal beams (21) of a frame (13) and allow reception of and detachable clamping to crossbeams (2) as disclosed above; a plurality of crossbeams (2) which can be engaged with at least two beam hooks (3) via an opening (19) in said hooks (3); a plurality of rail hooks (5,6) which can be engaged—and detachably clamped as discussed above—to said crossbeams (2) via an opening in said rail hooks (5,6); a plurality of rail beams (4) which can be supported by said rail hooks (5,6) as discussed above; and a shelving assembly (14) which is already (partly) assembled, whereby the sidewalls (36), floors (39), backstops (40) and top walls (31) are associated, and the roller-bars (29) are attached to the top connecting parts (38) of the shelving assembly (14), as discussed above.

In a most preferred embodiment, the kit comprises a plurality of beam hooks (3) which can be hooked over the horizontal beams (21) of a frame (13) and allow reception of and detachable clamping to crossbeams (2) as disclosed above; a plurality of crossbeams (2) which can be engaged with at least two beam hooks (3) via an opening (19) in said hooks (3); a plurality of rail hooks (5,6) which can be engaged—and detachably clamped as discussed above—to said crossbeams (2) via an opening in said rail hooks (5,6); a plurality of rail beams (4) which can be supported by said rail hooks (5,6) as discussed above; and a (partly) assembled shelving assembly (14)—instead of merely loose components—with flexible walls (31, 36, 39 and/or 40), which can be folded to take up a limited amount of space to constrain the dimensions of the kit.

It is supposed that the present invention is not restricted to any form of realization described previously and that some modifications can be added to the presented example of fabrication without reappraisal of the appended claims.

The invention claimed is:

1. A track-shelving system, comprising a) a frame having a plurality of vertical frame posts and a plurality of horizontal frame beams supported by the vertical frame posts and b) a track and shelving module connected to said frame, said track and shelving module comprises:
   a plurality of beam hooks, engaged with the horizontal frame beams;
   a plurality of crossbeams, a respective one or more of the plurality of crossbeams being engaged with at least two beam hooks by being received within a beam hook opening in each of said at least two beam hooks;
   a plurality of rail hooks, engaged to said crossbeams;
   a plurality of rail beams, supported by said rail hooks; and
   a shelving assembly, movable between a paired set of said rail beams;
   wherein said crossbeams are each provided with a plurality of indentations, regularly positioned along the length of said crossbeam for allowing clamping of said beam hooks and rail hooks to the crossbeams;
   wherein the beam hook opening of each of the at least two beam hooks includes an interior edge that engages an outer perimeter of the respective one or more of the plurality of crossbeams to clamp the interior edge of the beam hook opening into the plurality of indentations of each of the respective one or more of the plurality of crossbeams.

2. The track-shelving system according to claim 1, wherein the engagement of said beam hooks, said rail hooks, or both, is detachable.

3. The track-shelving system according to claim 1, wherein said interior edge of each beam hook opening comprises one or more teeth which click into the indentations of the respective one or more of the plurality of crossbeams.

4. The track-shelving system according to claim 1, wherein said interior edge of each beam hook opening clicks into both an upper indentation and a lower indentation of the indentations of each of the respective one or more of the plurality of crossbeams.

5. The track-shelving system according to claim 1, wherein the respective one or more of the plurality of crossbeams are engaged with at least two rail hooks by being received within a rail hook opening in each said at least two rail hooks; and the rail hook opening of each of the at least two rail hooks includes an interior edge that engages the outer perimeter of the respective one or more of the plurality of crossbeams to clamp the interior edge of the rail hook opening into the plurality of indentations of the respective one or more of the plurality of crossbeams.

6. The track-shelving system according to claim 5, wherein said interior edge of each rail hook opening clicks into both an upper indentation and a lower indentation of the indentations of each of the respective one or more of the plurality of crossbeams.

7. The track-shelving system according to claim 6, wherein said interior edge of each rail hook opening comprises one or more teeth which click into the indentations of the respective one or more of the plurality of crossbeams.

8. The track-shelving system according to claim 6, wherein the beam hooks, the rail hooks, or both comprise an assurance clip to secure clamping.

9. The track-shelving system according to claim 1, wherein said crossbeams comprises indentations every 5 to 100 mm, or every 5 to 50 mm, or every 5 to 20 mm.

10. The track-shelving system according to claim 1, wherein the crossbeams, beam hooks, rail beams and rail hooks comprise a profile-thickness of between 1.5 and 2.5 mm.

11. The track-shelving system according claim 1, wherein the respective one or more of the plurality of crossbeams comprise two back-to-back crossbeams.

12. The track-shelving system according claim 1, wherein the beam hooks are attached to the horizontal frame beams by a hooking mechanism.

13. The track-shelving system according to claim 12, wherein the beam hooks comprise a width-adjustable hooking mechanism.

14. The track-shelving system according to claim 5, wherein each said rail hook opening is enclosed by the interior edge of the rail hook opening.

15. The track-shelving system according to claim 5, wherein each said rail hook opening is incompletely enclosed by the interior edge of the rail hook opening.

16. The track-shelving system according to claim 1, wherein the beam hooks and rail hooks comprise one or more at least partly folded edge.

17. The track-shelving system according to claim 1, wherein the rail hooks comprise at least one small surface to support at least part of a rail beam.

18. The track-shelving system according to claim 17, wherein the small surface of the rail hooks comprises one or more at least partly upright surface.

19. The track-shelving system according to claim 1, wherein one of said rail beams is attached to one of said rail hooks by means of one or more mutually aligned fastening holes present on said rail beam and on said rail hook.

20. The track-shelving system according to claim 1, wherein the rails are detachably attached to one of said rail hooks by means of one or more rail assurance clips.

21. The track-shelving system according to claim 1, wherein the rail beams comprise a portion for receiving mobility components.

22. The track-shelving system according to claim 1, wherein paired ones of said rail beams are oriented in converse senses.

23. The track-shelving system according to claim 1, wherein paired ones of said rail beams are connected by one or more roller-bars.

24. A kit for converting a frame into a track-shelving system, said kit comprises:
   a plurality of beam hooks;
   a plurality of crossbeams;
   a plurality of rail hooks;
   a plurality of rail beams; and
   shelving module components;
   wherein said crossbeams are provided with a plurality of indentations, regularly positioned along the length of said crossbeam for allowing clamping of said beam hooks and rail hooks to said crossbeams;
   wherein said beam hooks are provided with a beam hook opening in which a respective one or more of the plurality of crossbeams are receivable with an interior edge of the beam hook opening engaging an outer perimeter of the respective one or more of the plurality of crossbeams to clamp the interior edge of the beam hook opening into the plurality of indentations of each of the respective one or more of the plurality of crossbeams; and
   wherein said rail hooks are provided with a rail hook opening in which the respective one or more of the plurality of crossbeams are receivable with an interior edge of the rail hook opening engaging an outer perimeter of the respective one or more of the plurality of crossbeams to clamp the interior edge of the rail hook opening into the plurality of indentations of each of the respective one or more of the plurality of crossbeams.

25. The kit according to claim 24, wherein said interior edge of each beam hook opening comprises one or more teeth which are clickable into the indentations of the respective one or more of the plurality of crossbeams.

26. The kit according to claim 24, wherein said interior edge of each beam hook opening is clickable into both an upper indentation and a lower indentation of the indentations of each of the respective one or more of the plurality of crossbeams.

27. The kit according to claim 26, wherein each said rail hook opening is incompletely enclosed by the interior edge of the rail hook opening.

28. The kit according to claim 25, wherein said interior edge of each rail hook opening comprises one or more teeth which are clickable into the indentations of the respective one or more of the plurality of crossbeams.

29. The kit according to claim 24, wherein the beam hooks are provided with a width-adjustable hooking mechanism.

30. The kit according to claim 24, wherein said beam hooks and rail hooks comprise one or more assurance clips.

31. The kit according to claim 24, wherein said crossbeams comprises indentations every 5 to 100 mm every 5 to 50 mm or every 5 to 20 mm.

32. The kit according to claim 24, wherein the crossbeams, beam hooks, rail beams and rail hooks comprise a profile thickness of between 1.5 and 2.5 mm.

33. The kit according to claim 24, wherein the beam hooks and rail hooks comprise one or more at least partly folded edges.

34. The kit according to claim 24, wherein the rail hooks each comprise at least one small surface perpendicular to a main surface thereof.

35. The kit according to claim 34, wherein the at least one small surface perpendicular to the main surface of each rail hook comprises at least one upright surface parallel to the main surface of the rail hook.

36. The kit according to claim 24, wherein the rail hooks and rail beams comprise one or more fastening holes or rail assurance holes.

37. The kit according to claim 36, wherein the kit further comprises fastening means for attaching a rail beam to a rail hook, via said one or more of fastening holes or rail assurance holes.

38. The kit according to claim 24, wherein the rail beams enclose a portion suitable for receiving mobility components.

39. The kit according to claim 24, wherein the respective one or more of the plurality of crossbeams comprise two back-to-back crossbeams.

40. The kit according to claim 24, wherein the shelving module components comprise at least a plurality of roller-bars, a plurality of mobility components, a pair of sidewalls, a top wall, one or more floors, one or more backstops and one or more top connection members.

41. The kit according to claim 40, wherein the shelving module is partly or completely assembled.

42. The kit according to claim 40, wherein at least some portion of the top connection members, top wall, side wall, floor and/or backstops are flexible.

43. The kit according to claim 42, wherein said flexible ones of the top connection members, top wall, side wall, floor and/or backstops are folded up in the kit.

44. The kit according to claim 26, wherein said interior edge of each rail hook opening is clickable into both an upper indentation and a lower indentation of the indentations of each of the respective one or more of the plurality of crossbeams.

45. The track-shelving system of claim 1, wherein both of said beam hooks and said rail hooks engage the indentations.

* * * * *